United States Patent [19]

Ryu

[11] Patent Number: 5,400,397
[45] Date of Patent: Mar. 21, 1995

[54] PRIVATE AUTOMATIC BRANCH EXCHANGE

[75] Inventor: Koji Ryu, Fukuoka, Japan

[73] Assignee: Matsushita Electric Industrial Co., Ltd., Osaka, Japan

[21] Appl. No.: 183,432

[22] Filed: Jan. 19, 1994

[30] Foreign Application Priority Data

Jan. 20, 1993 [JP] Japan .................... 5-007382

[51] Int. Cl.⁶ ............................................ H04M 3/02
[52] U.S. Cl. .................................. 379/201; 379/198; 379/156
[58] Field of Search ............... 379/94, 201, 200, 199, 379/198, 164, 165, 156, 157, 202, 212, 225, 227, 232, 234, 88, 67, 213, 214, 32, 221, 279, 210, 203, 204, 205, 206, 207

[56] References Cited

U.S. PATENT DOCUMENTS

| | | | |
|---|---|---|---|
| 5,151,934 | 9/1992 | Hayashi | 379/165 |
| 5,276,678 | 1/1994 | Hendrickson et al. | 379/202 |
| 5,303,298 | 4/1994 | Morganstein et al. | 379/212 |

Primary Examiner—James L. Dwyer
Assistant Examiner—Scott Wolinsky
Attorney, Agent, or Firm—Spencer, Frank & Schneider

[57] ABSTRACT

A private automatic branch exchange includes a four-wire type extension modular jack for connection to a four-wire type analog key telephone set as an extension terminal device and for connection to both a two-wire type digital key telephone set and a standard two-wire telephone set as extension terminal devices. Event determining circuitry determines whether or not an event has been received and the kind of extension terminal device concerning the event and outputs a control signal accordingly. Analog/digital key telephone set interface circuitry makes a data signal exchange with an analog key telephone set or a digital key telephone set connected to the extension modular jack. Standard telephone set interface circuitry makes an analog signal exchange with an analog key telephone set or a standard telephone set connected to the extension modular jack. At least two different extension numbers are stored including first and second extension numbers associated with at least the digital key telephone set and the standard telephone set, respectively. First and second call processors effects call processing of respective extension terminal devices associated with the first and second extension numbers, respectively. Selecting circuitry, responsive to the control signal from the event determining circuitry, selects one of the first and second call processor to effect the call processing.

5 Claims, 8 Drawing Sheets

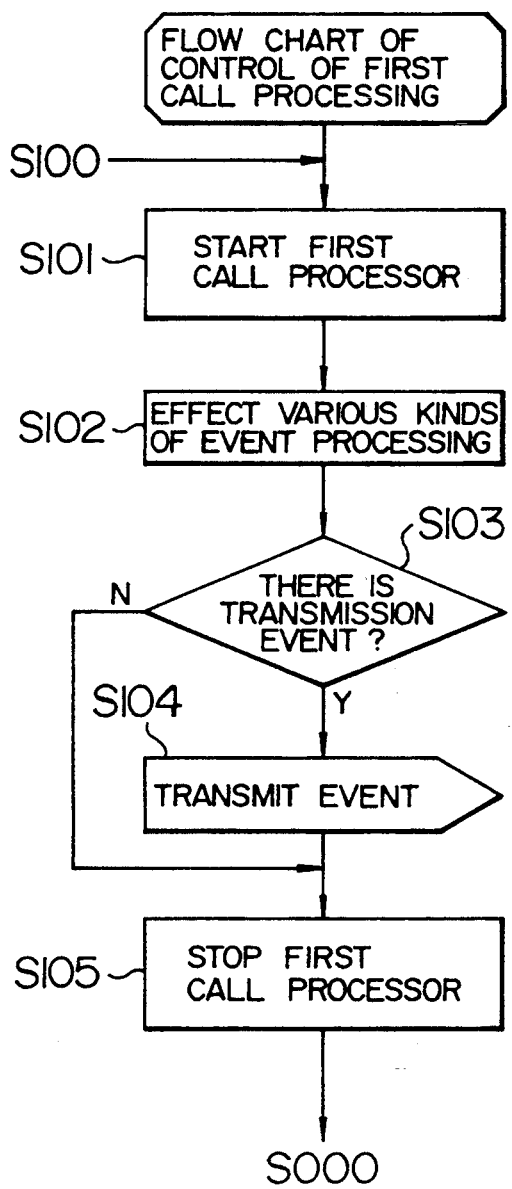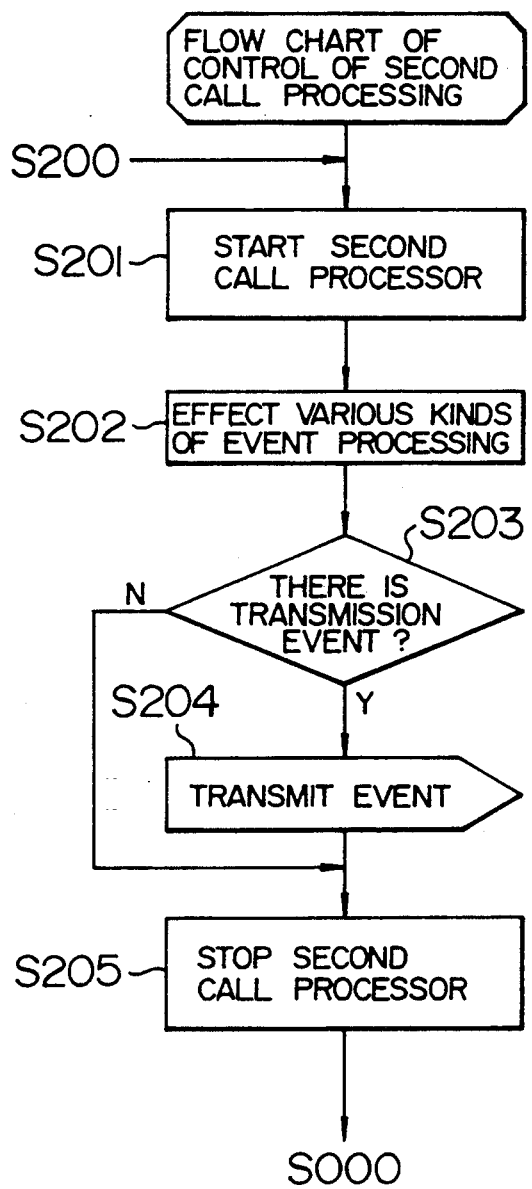

FIG. 6B

REGISTRATION IN STORAGE

| EXTENSION PORT | FIRST EXTENSION NUMBER | SECOND EXTENSION NUMBER |
|---|---|---|
| #1 | {2} {0} {0} | {3} {0} {0} |
| #2 | {5} {0} {0} | {5} {0} {1} |
| #3 | ... | ... |
| #n | ... | ... |

FIG. 6A

PORT NO. 1 FIRST CALL PROCESSING — PORT NO. 1 SECOND CALL PROCESSING

- OFF HOOK
- SEND DIAL TONE
- DIAL 300
- REQUEST CALLING
- RING BELL OF STANDARD TELEPHONE SET
- ISSUE CALLING ANSWER
- SEND RING BACK TONE

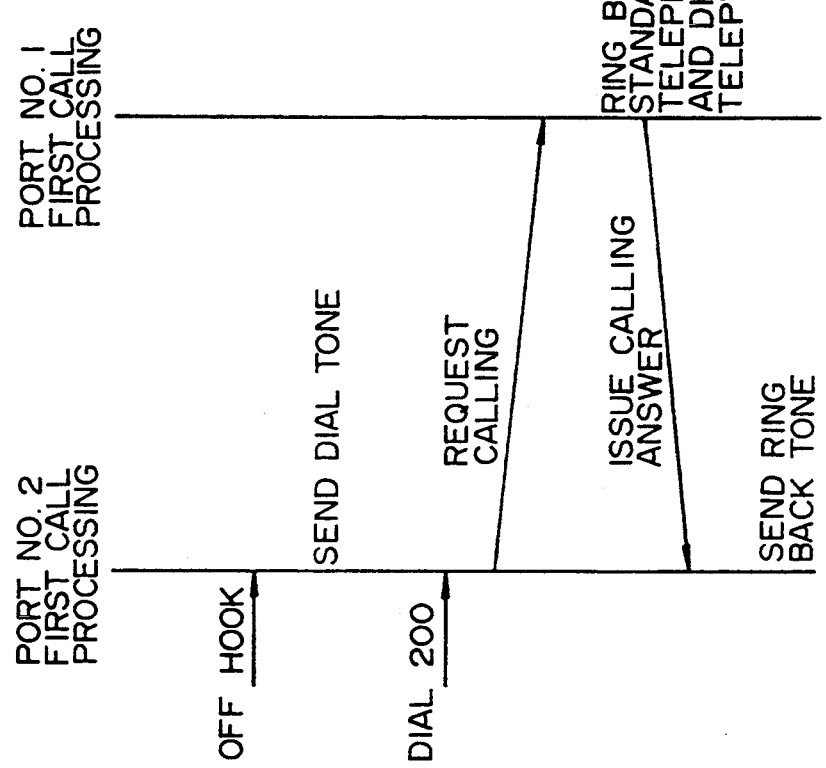

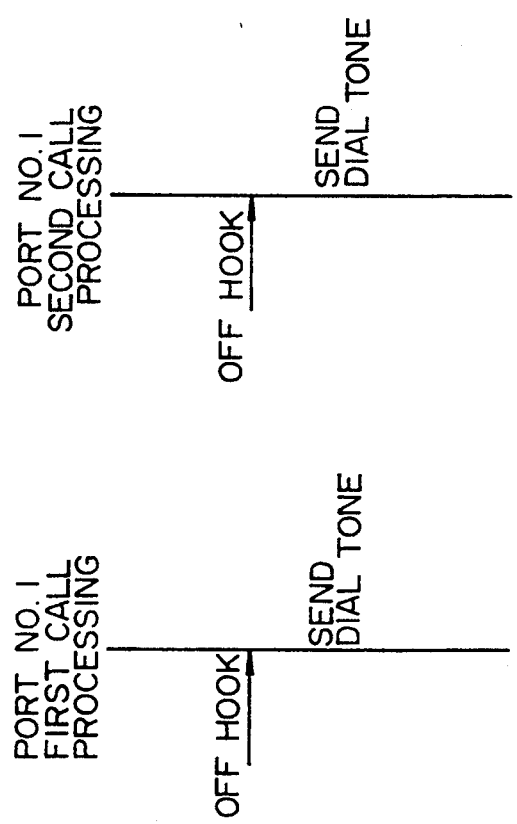

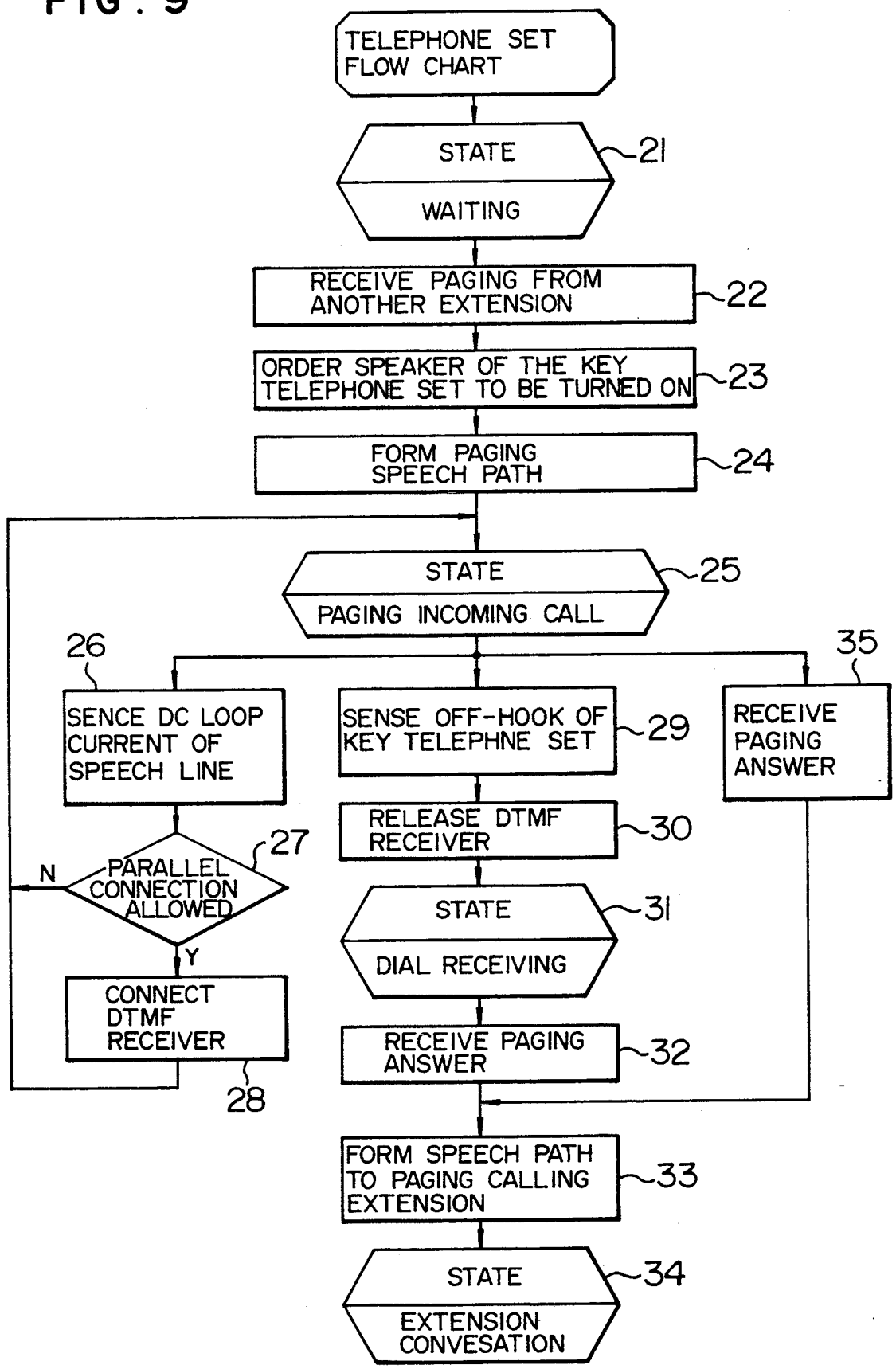

PRIVATE AUTOMATIC BRANCH EXCHANGE

BACKGROUND OF THE INVENTION

1. Field of the Invention

The present invention relates to a private automatic branch exchange.

2. Description of the Related Art

Conventionally, a private automatic branch exchange allowing use of digital key telephone sets, analog key telephone sets, and standard telephone sets as extension terminal devices has a function of automatically judging what kind of telephone set is connected to each extension. To be concrete, a conventional extension interface device judges automatically whether a telephone set using two pairs of conductors per extension has been connected. The conventional extension interface device has a function of automatically forming a judgment no matter what kind of telephone set has been connected to an extension.

Some conventional private automatic exchanges allow parallel connection of an analog key telephone set and a standard telephone set to each extension port or parallel connection of a digital key telephone set and a standard telephone set to each extension port so that they may be used as so-called parent and child telephone sets.

In the above described conventional system, however, both the analog key telephone set and the standard telephone set connected to one extension port in parallel have the same telephone number and use the same speech path in common, and hence they are controlled as one extension. The same may be said of parallel connection of a digital key telephone set and a standard telephone set.

In such a form that a key telephone set is used by a person different from a person using a standard telephone set, therefore, problems are posed. For example, privacy cannot be ensured, or two telephone sets cannot be used simultaneously.

SUMMARY OF THE INVENTION

In view of the problems of the above described conventional technique, the present invention has been made. When a digital key telephone set and a standard telephone set are connected to one extension port and used, respective telephone sets can operate as completely different extensions according to a configuration of the present invention.

In order to achieve this object, a private automatic branch exchange according to the present invention includes event determining means for determining whether an event has been received and determining a kind of a terminal concerning the event, storage means for storing telephone numbers possessed by extensions, standard telephone set interface means for controlling a standard telephone set, analog key telephone set interface means for controlling an analog key telephone set, digital key telephone set interface means for controlling a digital key telephone set, first call processing means for effecting call processing of a telephone set associated with a first telephone number, second call processing means for effecting call processing of a telephone set associated with a second telephone number, and switching means for connecting the standard telephone set interface means to either the first call processing means or the second call processing means.

When a digital key telephone set has been connected to one pair of wires belonging to a four-wire extension port, a standard telephone set capable of operating as a completely different extension can be connected to the remaining pair of wires owing to the above described configuration. This results in an advantage that the number of extensions accommodated in a system becomes twice the number of extension ports.

BRIEF DESCRIPTION OF THE DRAWINGS

FIG. 4 is a flow chart showing a control procedure of the private automatic branch exchange shown in FIG. 1;

FIG. 5 is a flow chart showing a control procedure of the private automatic branch exchange shown in FIG. 1;

FIG. 6A is a sequence flow diagram showing a control procedure of case when a standard telephone set is called from a digital key telephone set connected to the same extension port in the private automatic branch exchange shown in FIG. 1;

FIG. 6B is a registration data table showing contents of a storage of the private automatic branch exchange shown in FIG. 1;

FIG. 7A is a sequence flow diagram showing a control procedure of case where either of a digital key telephone set and a standard telephone set connected to the same extension port has been called in the private automatic branch exchange shown in FIG. 1;

FIG. 7B is a registration data table showing contents of a storage of the private automatic branch exchange shown in FIG. 1;

FIG. 8A is a sequence flow diagram showing a control procedure of case where a digital key telephone set and a standard telephone set connected to the same extension port have simultaneously originated calls in the private automatic branch exchange shown in FIG. 1;

FIG. 8B is a registration data table showing contents of a storage portion of the private automatic branch exchange shown in FIG. 1; and FIG. 9 is a flow chart showing a control procedure of case where paging call incoming has occurred in an analog key telephone set in a private automatic branch exchange according to a second embodiment of the present invention.

DESCRIPTION OF THE PREFERRED EMBODIMENTS

Figure 1:
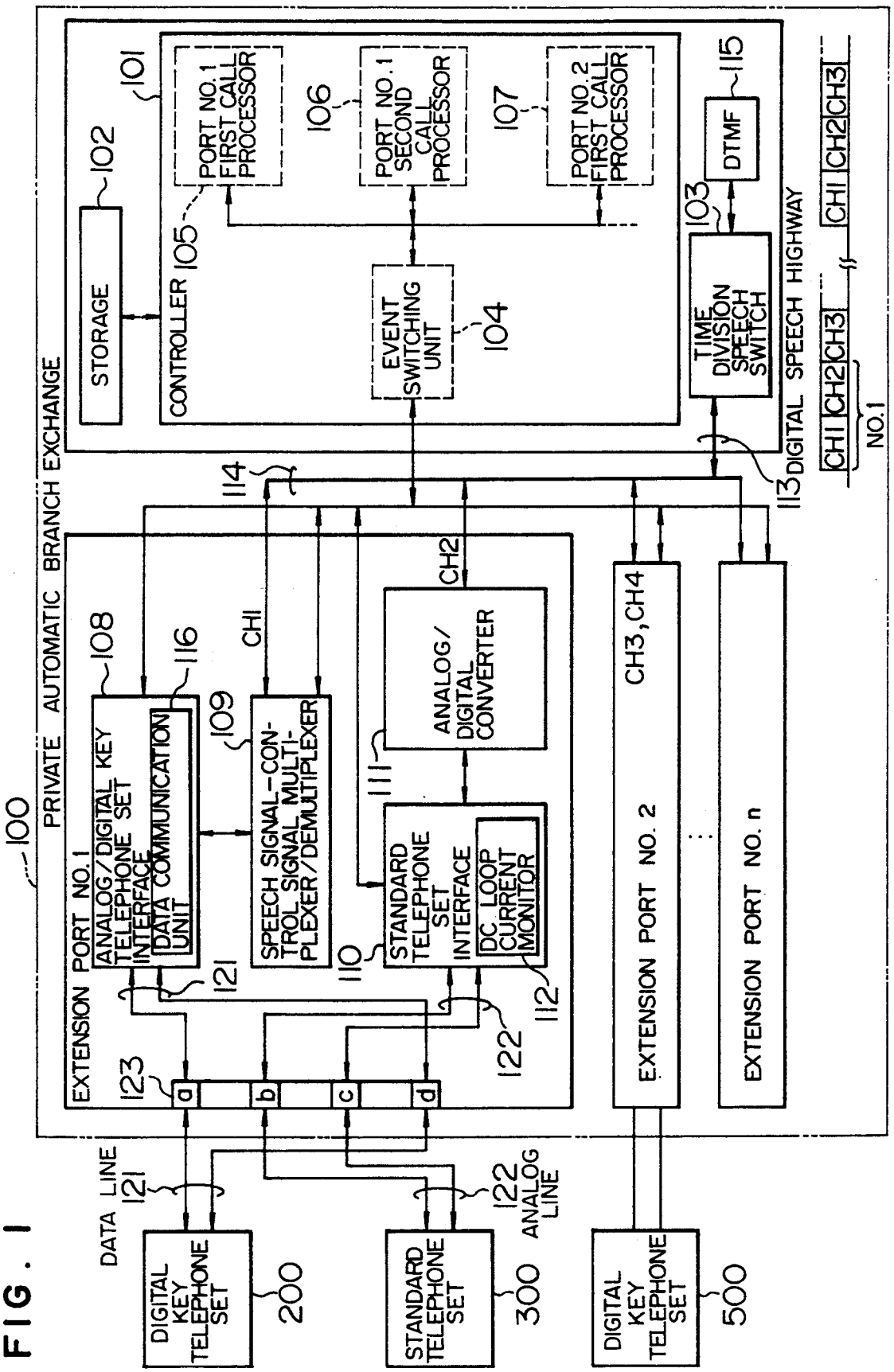
FIG. 1 is a configuration block diagram of a private automatic branch exchange according to a first embodiment of the present invention.
Figure 2:
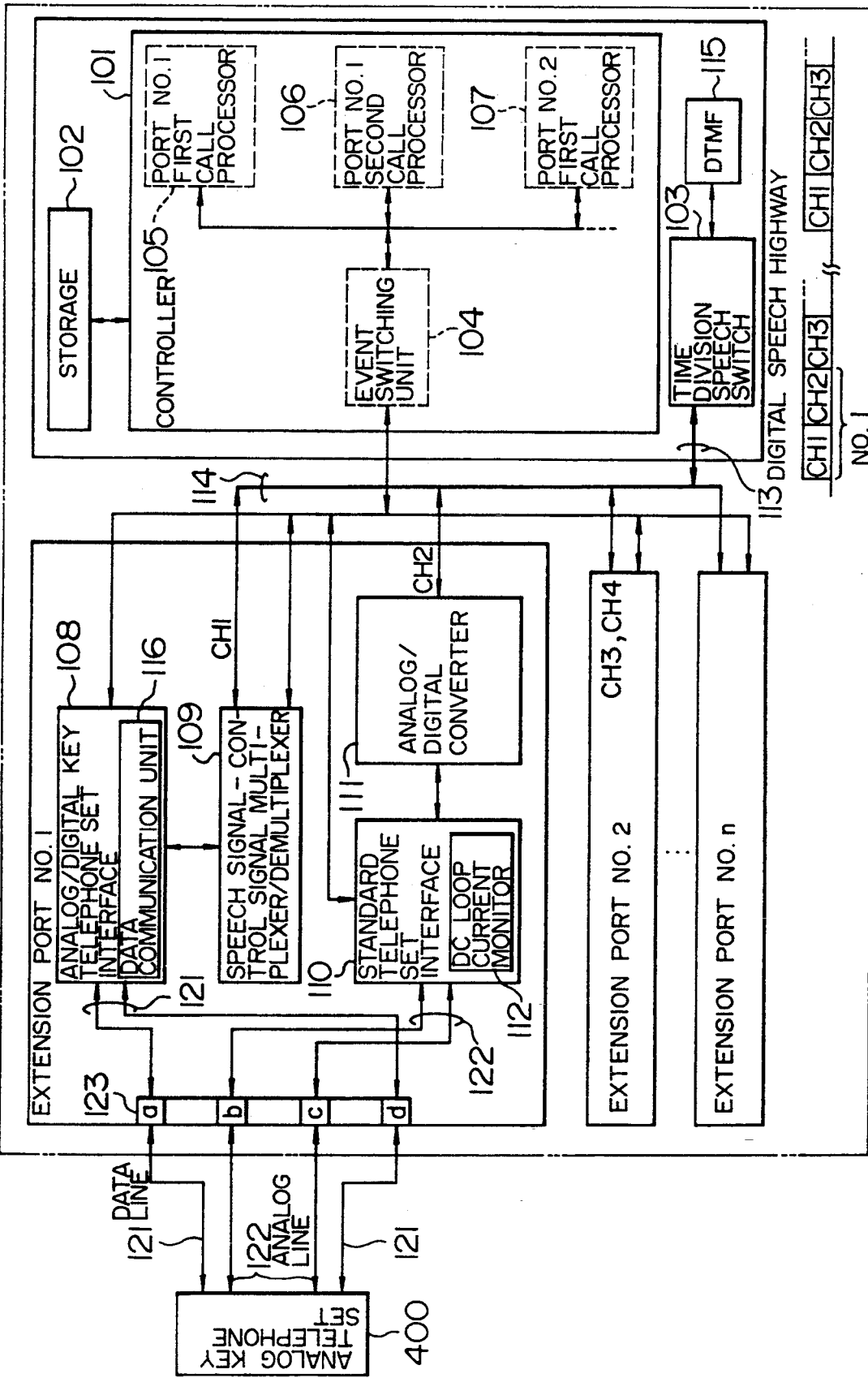
FIG. 2 is a configuration block diagram of the private automatic branch exchange shown in FIG. 1.
Figure 3:
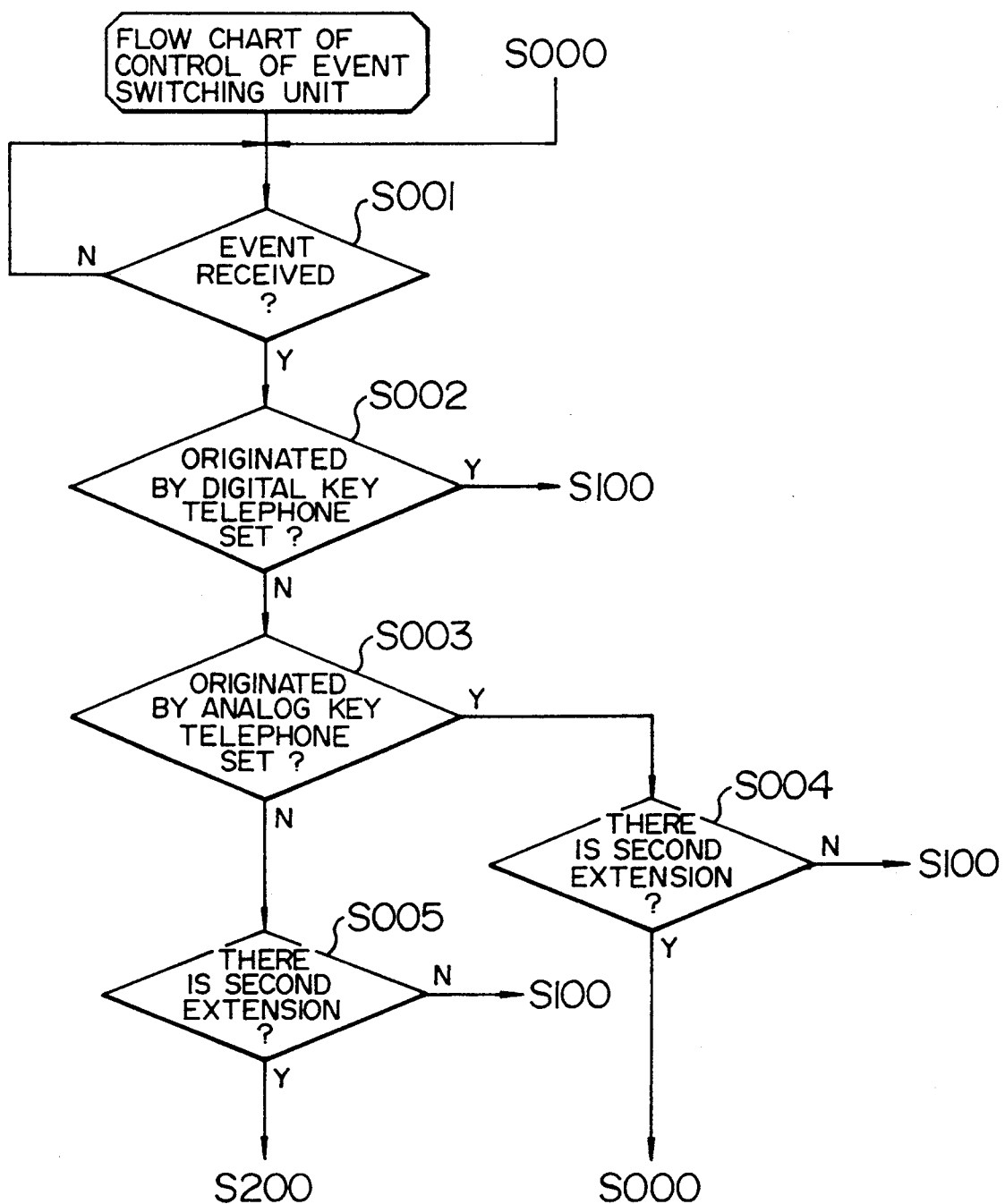
FIG. 3 is a flow chart showing a control procedure of the private automatic branch exchange shown in FIG. 1.

Preferred embodiments of a private automatic branch exchange according to the present invention will hereafter be described by referring to the drawings. FIGS. 1 and 2 are block diagrams of a private automatic branch exchange according to an embodiment of the present invention. FIG. 3 and succeeding drawings show flow charts expressing a summary of the processing.

In FIG. 1, numeral 100 denotes a private automatic branch exchange. Numeral 200 denotes a digital key telephone set connected to the private automatic branch exchange 100 as an extension terminal device. Numeral 300 denotes a standard telephone set connected to the private automatic branch exchange 100 as an extension terminal device.

Each of extension modular jacks 123 provided in the private automatic branch exchange 100 is a jack of a four-wire type whereby four terminals can be connected.

In case the digital key telephone set 200 is connected, two terminals located at both ends, i.e., terminals a and d, among the four terminals of the extension modular jack 123 are used. That is to say, a data line 121 for connecting the digital key telephone set 200 to the private automatic branch exchange 100 has a two-wire configuration. One of two wires of the data line 121 is connected to the terminal a, whereas the other of the two wires is connected to the terminal d.

In case the standard telephone set 300 is connected, two central terminals, i.e., terminals b and c, among the four terminals of the extension modular jack 123 are used. That is to say, one of two wires of an analog line 122 for connecting the standard telephone set 300 to the private automatic branch exchange 100 is connected to the terminal b, whereas the other of the two wires is connected to the terminal c.

In FIG. 2, numeral 400 denotes an analog key telephone set connected to the private automatic branch exchange 100 as an extension terminal device. In case the analog key telephone set 400 is connected as shown in FIG. 2, all of the four wires of the terminals a, b, c and d of the extension modular jack 123 are used. That is to say, lines for connecting the analog key telephone set 400 to the private automatic branch exchange 100 include one pair of data wires 121 connected to the terminals a and d of the extension modular jack 123 and one pair of analog wires 122 connected to the terminals b and c of the extension modular jack 123.

Configuration of the private automatic branch exchange 100 will now be described. Numeral 101 denotes a controller, and numeral 102 denotes a storage device. Numeral 103 denotes a time division speech switch, and numerals 113 and 114 denote digital speech highways for transmitting signals of a plurality of channels in a time division multiplex form. The time division speech switch 103 interchanges data between time slots on the digital speech highways 113 and 114 to perform switching connection of a plurality of speech paths. Numeral 115 denotes a DTMF signal receiver whose operation will be described later.

For example, CH1 is assigned to a channel for a digital key telephone set connected to an extension port No. 1, and CH2 is assigned to a channel for an analog key telephone set connected to the same extension port No. 1. Furthermore, CH3 is assigned to a channel for a digital key telephone set connected to an extension port No. 2, and CH4 is assigned to a channel for an analog key telephone set connected to the same extension port No. 2. The digital speech highways 113 and 114 as well as the time division speech switch 103 thus provide speech paths of two channels per extension port on the digital speech highways. That is to say, the digital key telephone set and the analog key telephone set have respective independent speech channels. Even if both telephone sets are simultaneously used, therefore, they are mutually prevented from interrupting the counterpart speech.

The controller 101 controls respective components, which will be described later, by using information stored in the storage 102 in accordance with flow charts shown in FIG. 3 and succeeding drawings.

Numeral 105 denotes a first call processor for effecting first call processing for the extension port No. 1. The first call processor 105 effects call processing of a telephone set associated with a first extension number (a digital key telephone set in this example). Likewise, numeral 107 denotes a first call processor for port No. 2.

Numeral 106 denotes a second call processor for effecting second call processing for the extension port No. 1. The second call processor 106 effects call processing of a telephone set associated with a second extension number (an analog key telephone set in this example). Call processing includes control of telephone switching such as receiving events including off-hook and dialling, sending a dial tone to a telephone set, and ringing the bell of a telephone set of dial destination.

Numeral 104 denotes an event switching unit for managing the combinations of respective telephone sets and respective call processors. For example, the event switching unit 104 switches the processing of the standard telephone set 300 from the first call processor 105 of the extension port No. 1 to the second call processor 106 of the extension port No. 1, and vice versa.

Numeral 108 denotes an analog/digital key telephone set interface including a data communication unit 116 for transmitting/receiving data signals to/from the digital key telephone set 200. In case the analog key telephone set 400 using four wires of the terminals a, b, c and d of the extension modular jack 123 as shown in FIG. 2 is connected, the analog/digital key telephone set interface 108 also transmits/receives data signals to/from the analog key telephone set 400. Analog speech of the analog key telephone set is processed in a standard telephone set interface 110, which will be described later.

Numeral 109 denotes a speech signal-control signal multiplexer/demultiplexer. The speech signal-control signal multiplexer/demultiplexer 109 demultiplexes a data signal for the digital key telephone set 200 to a speech signal and a control signal and, on the contrary, multiplexes a speech signal and a control signal to form a data signal for the digital key telephone set 200.

Numeral 110 denotes a standard telephone set interface for effecting standard telephone set processing such as dial receiving from the standard telephone set 300. The standard telephone set interface 110 has a function of sending a bell signal via the analog line 122 and a function of monitoring a DC loop current. Numeral 112 denotes a DC loop current monitor disposed in the standard telephone set interface 110 to monitor the DC loop current on the analog line 122 and dial pulses sent out from the standard telephone set 300. Numeral 111 denotes an analog/digital converter such as a Motorola MC-145503 for converting an analog speech signal to a digital signal and, on the contrary, converting a digital signal to an analog speech signal.

Operation of the present embodiment configured as heretofore described will now be described by referring to FIG. 3. FIG. 3 is a flow chart of control which is exercised over respective components by the event switching unit included in the controller 101.

First of all, the event switching unit 104 judges whether an event for an extension port under consideration has been received (S001). Unless received, judgment as to whether an event has been received is continued until an event is received. If there is a received event, it is judged whether the event has been originated by a digital key telephone set or an analog key telephone set (S002 and S003).

If the transmission source of the event is the digital key telephone set 200, processing proceeds to S100 (FIG. 4) to effect processing as the first extension in the first call processor. With reference to FIG. 4, the first call processor 105 is first started (S101) and various kinds of processing depending upon the event are executed (S102). In this case, speech is transmitted in a channel 1 on the digital speech highway 113 and switched by the time division speech switch 103 (FIG. 1).

If there is a transmission event for a digital key telephone set, then the event is transmitted to the digital key telephone set 200 via the analog/digital key telephone set interface 108 (S104), and thereafter the first call processor is stopped (S105). If there is not a transmission event (S103), the first call processor 105 is stopped (S105).

Returning to FIG. 3, if the transmission source of the event is the analog key telephone set 400 (S003), then it is judged whether the extension port under consideration registered in the storage 102 has one extension number or two extension numbers as shown in FIG. 3 (S004). If the extension port has only one extension number, processing proceeds to S100 (FIG. 4) for effect processing as the first extension.

With reference to FIG. 4, the first call processor 105 is first started (S101), and various kinds of processing depending upon the event are executed (S102). In this case, speech is subjected to A/D conversion in the A/D converter 111 shown in FIG. 1, controlled by channel 2 on the digital speech highway 113, and switched by the time division speech switch 103. If there is a transmission event for an analog key telephone set 400 (S103), then the event is transmitted to the analog key telephone set via the analog/digital key telephone set interface 108 (S104), and thereafter the first call processor 105 is stopped (S105).

Returning to FIG. 3, if there is a second extension number in the extension port under consideration, i.e., the second extension number has been registered in the storage 102 (S004), the received event is discarded because use of the analog key telephone set 400 in that extension port is not permitted.

If the transmission source of the event is the standard telephone set 300 (S003), it is judged whether the extension port under consideration registered in the storage 102 has one extension number or two extension numbers (S005). If the extension port has only one extension number, processing proceeds to S100 (FIG. 4) for effecting processing as the first extension. With reference to FIG. 4, the first call processor 105 is first started (S101), and various kinds of processing depending upon the event are executed (S102). In this case, speech is subjected to A/D conversion in the analog/digital converter 111 shown in FIG. 1, thereafter controlled by channel 2 on the digital speech highway 113, and switched by the time division speech switch 103. If there is a control event for a standard telephone set 300 (S103), then the standard telephone set 300 is controlled via the standard telephone set interface 110 and the first call processor 105 is stopped (S105).

On the other hand, if the extension port has two extension numbers (S005), processing proceeds to S200 (FIG. 5) for effecting processing as the second extension. With reference to FIG. 5, the second call processor 106 is first started (S201), and various kinds of processing depending upon the event are executed (S202). In this case as well, speech is controlled by channel 2 and switched by the time division speech switch 103 in the same way as the foregoing description. If there is a control event for a standard telephone set 300 (S203), then the event is transmitted (S204) to the standard telephone set 300 controlled via the standard telephone set interface 110 and finally the second call processor 106 is stopped (S205).

The operation sequence of the controller operating as heretofore described will now be described by actually referring to sequence flow diagrams.

FIG. 6A is a sequence flow diagram of respective controllers used when the standard telephone set 300 is called from the digital key telephone set 200 connected to the same extension port. In an example shown in FIG. 6B, an extension number {2}{0}{0} is registered beforehand in extension port No. 1 of the storage as a first extension number, and {3}{0}{0} is registered beforehand as a second extension number. And it is now assumed that the digital key telephone set 200 is connected to the extension port No. 1 as a first extension telephone set and the standard telephone set 300 is connected to the extension port No. 1 as a second extension telephone set as shown in FIG. 1.

When the digital key telephone set 200 becomes off the hook, the off-hook event is transmitted to the speech signal-control signal multiplexer/demultiplexer via the analog/digital key telephone set interface 108. The off-hook event is contained in the control signal there and taken in the event switching unit 104 included in the controller 101. Since the transmission source of the event is the digital key telephone set of the extension port No. 1, the event switching unit 104 starts the port No. 1 first call processor 105 (S101 in FIG. 4). In the first call processing therein, the received event causes the extension state to become dial receiving state and causes the dial tone to be connected to CH1. Thereby, the dial tone is heard at the digital key telephone set 200.

If in this state the extension number {3}{0}{0} of the second extension of the extension port No. 1 is dialled at the digital key telephone set 200, that dial event is taken in the event switching unit 104 via the same path as that of the above described off-hook event.

Since the transmission source of the event is the digital key telephone set of the same extension port No. 1, the event switching unit 104 starts the first call processor 105 of the extension port No. 1 (S101 in FIG. 4). In the first call processing therein, a search is made in the extension data table of the storage 102 shown in FIG. 6B on the basis of the received dial event. Since the extension corresponding to the number {3}{0}{0} is found to be the second extension of the jack 1, a calling request event is sent to the second call processor 106 of the extension port No. 1.

In response to this calling request event, the second call processing in the second call processor 106 of the extension port No. 1 is started. That is to say, if at this time the state of its own extension allows call incoming, then the second call processor 106 sends a calling answer event to the first call processor 105 in response to the calling request event, rings the bell of the standard telephone set 300 which is the second telephone set, and brings the extension state to a call incoming state.

In response to the calling answer event issued by the second call processor 106, the first call processing of the extension port No. 1 is started. Thus, the extension state of the digital key telephone set 200 which is the first telephone set is brought to an extension ringing state and a ring back tone is coupled to CH1. At the digital key telephone set 200, therefore, the ring back tone is heard. This means that ringing is being sent to the extension telephone set corresponding to the extension number {3}{0}{0}.

An example of FIG. 7A will now be described. The example of FIG. 7A shows a sequence flow diagram of respective controllers when call incoming has occurred in the digital key telephone set 200 and the standard telephone set 300 connected to the same extension port. It is assumed in this example that the second extension number is not registered in the extension port No. 1 of the storage as shown in FIG. 7B.

If the digital key telephone set 500 of the extension port No. 2 becomes off the hook and the extension number {2}{0}{0} belonging to the extension port No. 2 is dialled, a search is made in the extension data table of the storage 102 shown in FIG. 7B by the first call processor 107 of the extension port No. 2 on the basis of the received dial event. Since the extension corresponding to the number {2}{0}{0} is found to be the first extension of the jack 1, a calling request event is sent to the first call processor 105 of the extension port No. 1. In response to this calling request event, the first call processing of the extension port No. 1 is started. If the state of its own extension allows call incoming, a calling answer event is sent to the first call processor 107 of the extension port No. 2 in response to this calling request event.

Then, a research is made in the data table of its own extension shown in FIG. 7B. In this example, however, a second extension number is not registered beforehand for the extension port No. 1. Even if two telephone sets are connected to the extension port No. 1, therefore, the two telephone sets are handled as the same extension. That is to say, the bell of the digital key telephone set 200 is rung, and at the same time the bell of the standard telephone set 300 is rung. In addition, the extension state is brought to the call incoming state, and processing is stopped.

The above described calling answer event caused by the first call processing of the extension port No. 1 starts the first call processing of the extension port No. 2, brings the extension state of the digital key telephone set 500 which is the first telephone set to the extension ringing state, and couples the ring back tone to CH1. At the digital key telephone set 500, therefore, the ring back tone meaning that ringing is being sent to the extension telephone set corresponding to the extension number {2}{0}{0} is heard.

If the extension port No. 1 has a second extension number in FIG. 7A, a calling answer event is sent to the first call processor of the extension port No. 2 by the first call processing of the extension port No. 1 in response to the calling request event. Thereafter, a search is made in its own extension data table shown in FIG. 7B, and the bell of only the digital key telephone set 200 is rung in response to the fact that the second extension number has been registered beforehand.

An example of FIG. 8A will now be described. The example of FIG. 8A shows a sequence flow diagram of respective controllers when both the digital key telephone set 200 and the standard telephone set 300 connected to the same extension port have originated calls at the same time. It is assumed in this example that an extension number {3}{0}{0} has been registered beforehand in the extension port No. 1 of the storage as a second extension number as shown in FIG. 8B. Furthermore, it is assumed that the digital key telephone set 200 and the standard telephone set 300 are connected to the extension port No. 1 respectively as the first and second extension telephone sets as shown in FIG. 1.

If the digital key telephone set 200 connected to the extension port No. 1 becomes off the hook, the off-hook event is sent to the speech signal-control signal multiplexer/demultiplexer 109 via the analog/digital key telephone set interface 108. In the speech signal-control signal multiplexer/demultiplexer 109, the off-hook event is contained in the control signal and taken in the event switching unit 104 included in the controller 101. Since the transmission source of the event is the digital key telephone of the extension port No. 1, the event switching unit 104 starts the first call processor 105 of the extension port No. 1 (S101 in FIG. 4). In the first call processing of the first call processor 105, the received off-hook event brings the extension state to a dial receiving state and the dial tone is coupled to CH1. At the digital key telephone set 200, therefore, the dial tone is heard.

If the standard telephone set 300 connected to the extension port No. 1 becomes off the hook, the off-hook event is contained in the control signal-in the standard telephone set interface 110 and taken in the event switching unit 104 included in the controller 101. Since the transmission source of the event is the standard telephone set of the extension port. No. 1, the switching unit 104 makes a search in the extension data table (FIG. 8B) of the storage 102, and starts the second call processor 106 of the extension port No. 1 because the second extension number {3}{0}{0} has been registered beforehand.

In the second call processing of the second call processor 106, the received off-hook event brings the extension state to the dial receiving state and the dial tone is coupled to CH2. At the standard telephone set 300, therefore, the dial tone is heard. If dialling is performed thereafter from either telephone set, control is exercised respectively by the first call processing and the second call processing and the telephone sets operate as independent extensions.

In case a digital key telephone set is connected to one pair of terminals of a telephone extension port, the present embodiment allows connection of a standard telephone set capable of operating as a completely different extension without changing the four-wire extension port configuration used in conventional analog key telephone sets as heretofore described. Therefore, the number of extensions accommodated in a system becomes twice the number of extension ports, resulting in a significant practical effect.

Another embodiment will hereafter be described by referring to drawings. In the private automatic branch exchange 100 shown in FIG. 2, the analog/digital key telephone set interface 108 includes a data communication unit 116, which exchanges data with the analog key telephone set 400 via the data line 121. Numeral 115 denotes a DTMF signal receiver. The DTMF signal receiver 115 receives a digitized DTMF signal sent from the standard telephone set 300 via the analog line 122, the standard telephone set interface 110, the analog/digital converter 111, and the time division speech switch 103. In the storage 102, parallel connection capability information representing whether the analog key telephone set 400 and the standard telephone set 300 can be connected in parallel and used as parent and child telephone sets is registered beforehand for each extension.

Operation of the present embodiment configured as heretofore described will now be described by referring to FIG. 9. FIG. 9 is a control flow chart of case where paging call incoming has occurred in an extension port having the analog key telephone set 400 connected thereto. It is first assumed in FIG. 9 that an extension is in a waiting state (step 21) and paging is received from another extension in the meantime (step 22). In order to send out speech announcement of a paging caller from a speaker of the analog key telephone set 400, speaker-on data is transmitted to the analog key telephone set 400 via the communication unit 116 (step 23). Then a speech path from a paging calling extension to the extension under consideration is formed (step 24), and the extension state is shifted to the paging call incoming state (step 25).

Since the speaker of the analog key telephone set 400 is then turned on, a switch included in the analog key telephone set 400 is automatically closed and a DC loop current flows through the analog line 122. In the course of paging incoming, therefore, the DC loop current of the analog line 122 is sensed via the DC loop current monitor 112 (step 26). At this time, parallel connection capability information of the extension under consideration registered beforehand in the storage 102 is checked (step 27).

If registered contents allow parallel connection, then the analog line 122 is connected to the DTMF signal receiver by the time division speech switch 103 (step 28) and a paging answer from the standard telephone set 300 is monitored. If the registered contents do not allow parallel connection, the analog line 122 is not connected to the DTMF signal receiver 115.

Answer processing to paging incoming will now be described. First of all, in case of paging answer processing at the ordinary analog key telephone set 400, off-hooking on the analog key telephone set 400 causes off-hook of the analog key telephone set 400 to be sensed via the data communication unit 116 (step 29), releases the unused DTMF signal receiver 115 (step 30), shifts the extension state to the dial receiving state (step 31), and causes paging answer dial from the analog key telephone set 400 to be monitored. If a paging answer number is dialled at the analog key telephone set 400, then it is sensed via the data communication unit 116 (step 32) and a speech path between the paging calling extension and the extension under consideration is formed (step 33), and thereafter the extension state is shifted to the extension conversation state (step 34).

Processing for answering to paging at the standard telephone set 300 will now be described. The user of the standard telephone set 300 hears paging incoming call from the analog key telephone set 400, makes the receiver off the hook, and operates keys to input a paging answer number. This is sensed by the DTMF signal receiver 115 via the time division speech switch 103 (step 35). Then, a speech path between the paging calling extension and the extension under consideration is formed (step 33), and the extension state is shifted to the extension conversation state (step 34).

When paging call incoming has occurred in an analog key telephone set, the present embodiment makes it possible to analyze a DTMF signal fed from a standard telephone set connected and used in parallel to the analog key telephone set by monitoring the DTMF signal in a DTMF signal receiver as heretofore described. In case an analog key telephone set and a standard telephone set are connected to one extension port in parallel and used, therefore, paging answering from the standard telephone set becomes possible. In case the analog key telephone set is located at a distance from the standard telephone set and there are no persons near the analog key telephone set, paging can be conveniently answered from the standard telephone set. Furthermore, since the DTMF signal receiver is used only when parallel connection capability information registered beforehand allows parallel connection, the system can be implemented by using DTMF signal receivers fewer than extensions and cost can be reduced.

I claim:

1. A private automatic branch exchange comprising:
   at least one four-wire type extension modular jack which can be connected to a four-wire type analog key telephone set as an extension terminal device and which can be connected to both a two-wire type digital key telephone set and a standard two-wire telephone set as extension terminal devices;
   event determining means for determining whether or not an event has been received and determining the kind of extension terminal device concerning the event so as to output a control signal accordingly;
   at least one analog/digital key telephone set interface means for making a data signal exchange with one of an analog key telephone set and a digital key telephone set connected to said extension modular jack;
   at least one standard telephone set interface means for making an analog signal exchange with one of an analog key telephone set and a standard telephone set connected to said extension modular jack;.
   storage means for storing at least two different extension numbers including first and second extension numbers associated with at least said digital key telephone set and said standard telephone set, respectively;
   first call processing means for effecting call processing of an extension terminal device associated with the first extension number;
   second call processing means for effecting call processing of an extension terminal device associated with the second extension number; and
   selecting means, responsive to the control signal from said event determining means, for selecting one of said first call processing means and said second call processing means to effect the call processing.

2. A private automatic branch exchange according to claim 1, wherein:
   said private automatic branch exchange comprises a plurality of extension ports, each extension port having a respective extension modular jack, a respective analog/digital key telephone set interface means, and a respective standard telephone set interface means, said private automatic branch exchange having a respective first and second call processing means for each of said extension ports, respectively;
   said event determining means determines whether or not an event for an extension port under consideration has been received and determines the kind of extension terminal device concerning the event so as to output a control signal accordingly;
   said storage means stores a plurality of said first and second extension numbers for said plurality of extension ports; and said selecting means, responsive to the control signal from said event determining means, selects one of said first call processing means and said second call processing means for the extension port under consideration.

3. A private automatic branch exchange according to claim 2, further comprising:

analog/digital converter means for converting an analog signal sent from said standard telephone set interface means into a digital signal and converting an input digital signal into an analog signal to be sent to said standard telephone set interface means, for each of said plurality of extension ports;

a digital speech highway having a plurality of time-division multiplexed channels, at least two channels of which are assigned to each of said plurality of extension ports, a digital signal output from said digital key telephone set interface means being carried on one of said at least two channels and a digital signal output from said analog/digital converter means being carried on the other of said at least two channels in each of said plurality of extension ports; and a time division speech switch for effecting exchange connection of a speech path by interchanging data between said plurality of time-division multiplexed channels of said digital speech highways.

4. A private automatic branch exchange according to claim 2, further comprising:

analog/digital converter means for converting an analog signal sent from said standard telephone set interface means into a digital signal and converting an input digital signal into an analog signal to be sent to said standard telephone set interface means, for each of said plurality of extension ports;

DTMF signal receiving means for receiving a DTMF signal transmitted from the standard telephone set via an analog line, which connects said extension modular jack to said standard telephone set interface means, and via said analog/digital converter means;

speech path means for connecting or disconnecting a speech path between each of said plurality of extension ports and said DTMF signal receiving means; and control means, when the digital key telephone set is connected to one of said plurality of extension ports together with the standard telephone set and receives a paging input, responsive to sensing of a DC loop current of said analog line monitored by said standard telephone set interface means of said extension port, for controlling said speech path means to connect said standard telephone set to said DTMF signal receiving means via said analog/digital converter means so as to respond to the paging input by using said standard telephone set.

5. A private automatic branch exchange according to claim 2, further comprising:

analog/digital converter means for converting an analog signal sent from said standard telephone set interface means into a digital signal and converting an input digital signal into an analog Signal to be sent to said standard telephone set interface means, for each of said plurality of extension ports;

DTMF signal receiving means for receiving a DTMF signal transmitted from the standard telephone set via an analog line, which connects said extension modular jack to said standard telephone set interface means, and via said analog/digital converter means;

a digital speech highway having a plurality of time-division multiplexed channels;

a time division speech switch for effecting exchange connection of a speech path by interchanging data between channels on said digital speech highway; and control means, when the digital key telephone set is connected to one of said plurality of extension ports together with the standard telephone set and receives a paging input, responsive to sensing of a DC loop current of said analog line monitored by said standard telephone set interface means of said extension port, for controlling said time division speech switch to send a signal fed from said standard telephone set to said DTMF signal receiving means via said analog/digital converter means so as to respond to the paging input by using said standard telephone set.

* * * * *